No. 833,143. PATENTED OCT. 9, 1906.
E. H. WOLF.
HOSE COUPLING AND VALVE.
APPLICATION FILED DEC. 30, 1904.

2 SHEETS—SHEET 1.

Witnesses: Edward H. Wolf. Inventor
By his Attorney
Newell S. Wright.

No. 833,146. PATENTED OCT. 9, 1906.
E. H. WOLF.
HOSE COUPLING AND VALVE.
APPLICATION FILED DEC. 30, 1904.
2 SHEETS—SHEET 2.
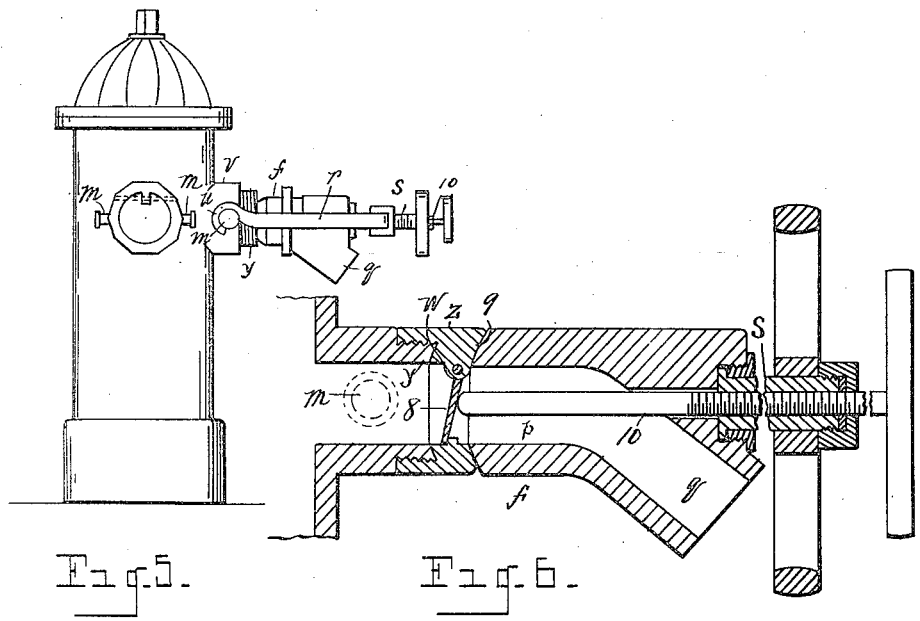
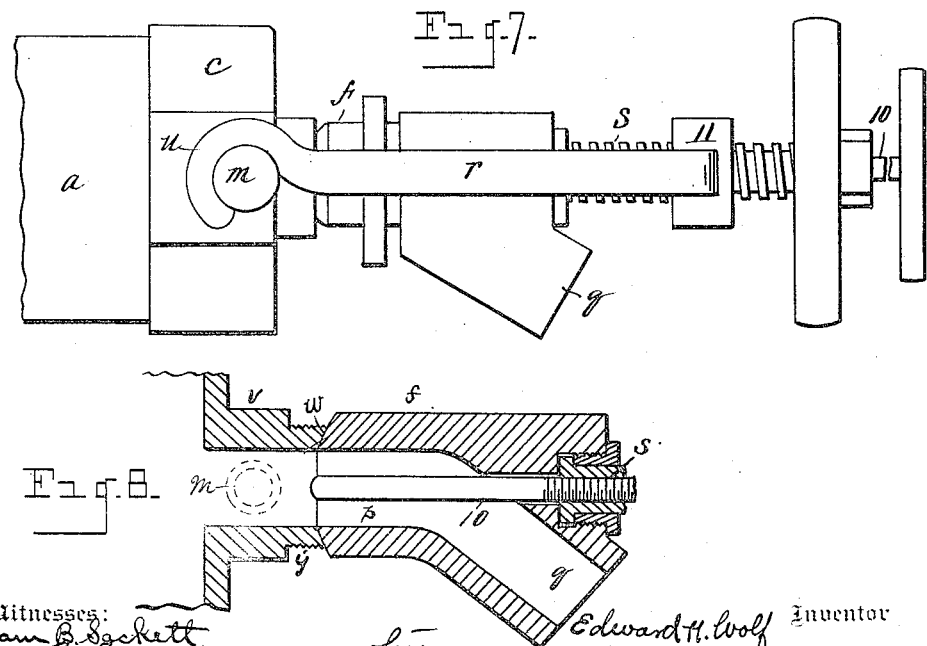

UNITED STATES PATENT OFFICE.

EDWARD H. WOLF, OF DETROIT, MICHIGAN.

HOSE-COUPLING AND VALVE.

No. 833,143.  Specification of Letters Patent.  Patented Oct. 9, 1906.

Application filed December 30, 1904. Serial No. 238,943.

*To all whom it may concern:*

Be it known that I, EDWARD H. WOLF, a citizen of the United States, residing at Detroit, county of Wayne, State of Michigan, have invented a certain new and useful Improvement in a Hose-Coupler and Valve, of which the following is a specification, reference being had to the accompanying drawings, which form a part of this specification.

My invention has for its object a hose-coupler and valve; and it consists of the combination and arrangement of devices and appliances hereinafter described and claimed, and illustrated in the accompanying drawings, in which—

Figures 1, 2:
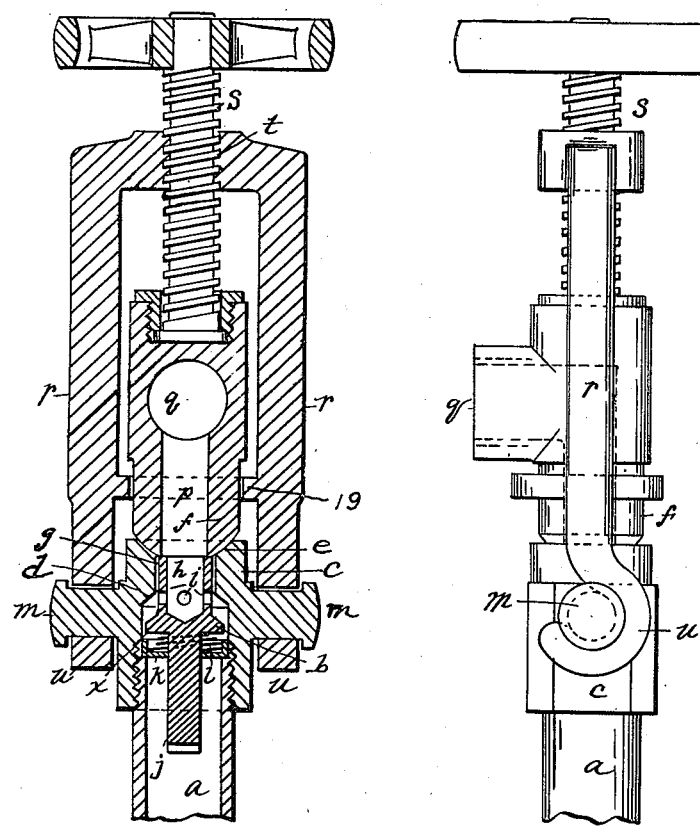
Figures 3, 4:
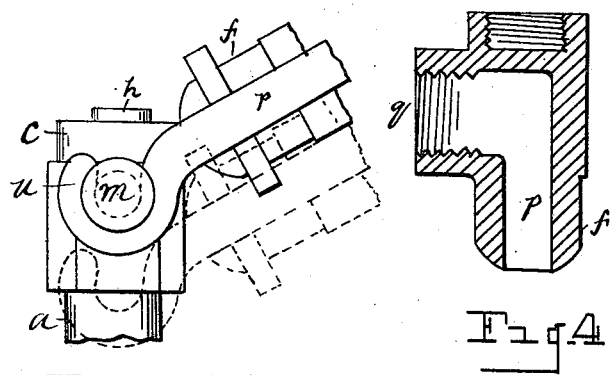

Figure 1 is a view in side elevation, illustrating features of my invention. Fig. 2 is a view in longitudinal section at right angles to Fig. 1. Fig. 3 is a view of portions of the mechanism, showing the coupler in position to be detached. Fig. 4 is a view in cross-section through the plunger at right angles to the section thereof shown in Fig. 2. Fig. 5 illustrates features of my invention as applied to a fire-hydrant and showing a slight modification in the construction of the coupler. Fig. 6 is a view in longitudinal section through portions of the coupler mechanism, showing another modification. Fig. 7 is an enlarged view in side elevation, illustrating portions of the device shown in Fig. 5. Fig. 8 is a view in section similar to Fig. 6, the cap 2 being omitted.

My invention is designed to provide a hose-coupler and valve for pneumatic tools for water, steam, gas, and oil pipes, for fire-department hose, and analogous purposes, the invention being designed for any and all uses to which it may be found applicable.

As illustrated in Figs. 1, 2, 3, and 7, $a$ represents a supply-pipe—as, for example, a pipe for supplying compressed air to pneumatic tools, although I do not limit myself thereto. This supply-pipe is shown provided with a valve, as at $b$, made reciprocatory longitudinally in the adjacent end of the pipe. Upon the end of the supply-pipe there is engaged a valve-casing $c$, provided with a seat $d$, upon which the valve $b$ seats to close communication through said valve-case. Said valve-case is also provided with a seat $e$ at the extremity thereof, upon which may be seated a plunger $f$. The valve-case $c$ may be engaged upon the supply-pipe $a$ in any suitable manner and is formed with a channel $g$ through the outer end thereof. The valve $b$ is provided with a hollow stem $h$, projecting into the channel $g$ and reciprocatory therein, the stem $h$ being constructed with suitable openings, (indicated at $i$.) Said valve is also preferably constructed with a stem $j$ at the opposite end thereof, extending through the diaphragm $k$, and a spring $l$ preferably is employed to normally hold the valve $b$ upon the seat $d$. The valve-casing is also preferably provided with arms or trunnions $m$ $m$, extending laterally therefrom.

The plunger is provided with a channel $p$, communicable through the hollow stem $h$ of the valve $b$, the plunger being constructed to be attached to any desired implement by means of a channeled connecting-arm $q$, opening in the channel $p$. The plunger is carried by a yoke or framework $r$, in which it is made reciprocatory, any suitable means being employed to actuate the plunger—as, for example, a hand-screw $s$, threaded through said yoke or framework, as indicated at $t$, and engaged at its inner end with the plunger in any suitable manner. The plunger may be connected with any desired member, as with a hose-pipe, a pneumatic tool, a water or steam pipe, and the like, as by means of the connecting-arm $q$. Said framework is also preferably provided at one end thereof with hooked arms $u$ $u$ to engage the corresponding arms upon the valve-case $c$. It will be obvious that an implement provided with the plunger may be readily attached to the valve-case $c$, as by hooking the arms $u$ $u$ upon the arms $m$ $m$ of the valve-casing of the supply-pipe.

It will be understood that when an implement provided with the plunger is detached from the valve-casing $c$ the plunger will be in an unseated position—i. e., when it is desired to detach an implement provided with the plunger from the supply mechanism the plunger will be first withdrawn from the seat $e$, permitting the ready detachment of the frame or yoke $r$ from the supply mechanism.

It will also be readily seen that when it is desired to attach any implement to the supply mechanism above described the said yoke or framework is hooked upon the arms $m$ $m$ and that to put said implement into working condition the plunger is seated upon the valve-case $c$, thereby moving the valve $b$ away from the seat $d$, permitting a free passage of the supply through the extremity of the pipe a, and the stem h of the valve b, the air or other supply passing thus through the channel p and channeled arm q to the implement to which the plunger is connected. When the plunger is to be connected with a fire-hose, I prefer that the channeled arm q should not form a right angle with the passage p, but that the channeled arm q should extend at an obtuse angle to the body of the plunger, as shown more particularly in Figs. 5, 6, and 7 and 8.

It will readily be seen that my invention may be applied to a fire-hydrant and to a fire-hose, the fire-hydrant being provided with a channeled arm v in a customary manner, except that said arm is provided with the laterally-extended arms m m and that the outer end of the channeled arm v should be constructed with a seat w for the extremity of the plunger. As applied to a hydrant the valve b (shown in Fig. 2) might be omitted, the ordinary controlling-valve of the hydrant being employed in its place. When my invention is applied to a hydrant, it will obviously only be necessary that the framework or yoke of the plunger be attached to the arms m m on the hydrant and that the plunger be seated upon the seat w of the hydrant-arm v. Then by opening the ordinary hydrant-valve free connection is effected from the hydrant through the plunger to the fire-hose, to which the plunger is connected. Where it is desired to attach an implement quickly to a supply-pipe and without the loss of air or other supply, I prefer to employ the valve b within the valve-case c—as, for example, upon pneumatic tools. It is readily understood that in the ordinary use of pneumatic tools the loss of air has often been great; but it will be seen that the valve b is automatic in its operation and that just as soon as the plunger is released from its seat e the valve b will seat and close off the discharge from the supply-pipe. The spring l is desirable, especially where the supply-pipe extends vertically, to counteract the gravity of the valve. It will be obvious that the supply-pressure upon the valve b will automatically seat said valve upon the seat d when the valve is free to move. In order that the supply-pressure may automatically actuate the valve b, said valve is provided with a shoulder x to receive the supply-pressure to automatically close the valve. The plunger and its seat e should preferably have a ball-joint connection, so that the plunger may seat closely to prevent any escape of the supply at the union of the plunger upon its seat.

To attach my invention to an ordinary fire-hydrant, the attaching-arm of the hydrant should be tapped to receive steel studs or arms m m. The attaching-arms of the hydrant are usually formed with a threaded nipple, (indicated at y,) which would be faced up to form the valve-seat w. In double hydrants or wherever plural attaching-arms are employed I prefer to provide one or more of such arms with a cap z, having a threaded engagement upon the nipple, said cap being provided with a check-valve (indicated by the numeral 8) and with a seat (indicated by the numeral 9) to receive the adjacent end of the plunger.

My invention for application to double hydrants also contemplates providing the coupler mechanism with an additional spindle 10, threaded through a portion of the screw s, which would in this instance be made hollow, the spindle passing also through the plunger to bear against the check-valve 8. It will be evident that by such a construction the engine first to arrive and to attach its hose upon an arm of the hydrant could remove the cap from the nipple y, attach the hose-coupler as above described, the plunger seating upon the valve w to begin operations. The next engine to arrive provided with a coupler like that indicated in Figs. 5, 6, 7, and 8 by attaching the coupler upon the hydrant-arm and seating the plunger upon the seat 9 of the cap could by means of the spindle 10 open the check-valve 8 and begin operations by opening the corresponding hydrant-valve without the necessity of first shutting off the hydrant from the engine already in operation.

I would have it understood that I do not limit myself solely to any particular valve in the valve-casing c or to the hydrant-cap z. It will be obvious that instead of actuating the valve b by the seating of the plunger the provision of the coupler mechanism with the spindle 10 enables me to unseat other forms of valves controlling communication from the supply device to the attached implement. By means of the automatic valve b, however, an implement could be put into working operation more quickly than would be the case were it necessary to actuate a corresponding valve by means of a spindle 10.

The fire department, it is contemplated, would carry the caps z, which could readily be applied to the threaded nipple y by removing the ordinary cap with which hydrants are customarily supplied. So, also, the fire department might carry the form of coupler mechanism shown in Figs. 5-8 to slip onto the hose. The only change, then, being required in the customary hydrants would be to attach the arms m m thereto.

It will be observed that the yoke or frame r is constructed toward the hooked end thereof with an inwardly-projecting shoulder, (indicated at the numeral 19,) through which the plunger p projects. The shoulder 19 serves to guide the plunger, while also the plunger is laterally movable therein. In other words, the plunger is oscillatory or swiveled in said shoulder. It will be noticed that the engagement of the screw s with the plunger is such as to permit the oscillation of the plunger also.

What I claim as my invention is—

1. In a hose-coupler and valve for the purpose described the combination of a supply-pipe, a separately-constructed channeled valve-casing removably secured upon the exterior of the supply-pipe at one end thereof provided with an end valve-seat at the inner end thereof and with an interior valve-seat between the extremities of the casing, a reciprocatory valve seating upon the interior valve-seat and normally projecting through and beyond the end valve-seat of the casing, a detachable channeled reciprocatory plunger to contact with the end of said valve to unseat said valve from the intermediate valve-seat and to seat upon the end valve-seat of the casing, a coupling member to carry the plunger, means to reciprocate said plunger, said valve-casing provided with external means whereby said coupling member may be detachably engaged upon the exterior of the casing, said valve seating automatically upon the intermediate valve-seat when the plunger is unseated.

2. In a hose-coupler and valve for the purposes described, the combination of a supply-pipe provided with a channeled valve-casing at one end thereof having an end valve-seat at its inner end and an interior valve-seat between the extremities of the casing, a reciprocatory valve seating within the casing upon the interior valve-seat and normally projecting through and beyond the valve-seat of the casing, a channeled reciprocatory plunger to contact with the end of said valve seating upon the seat at the end of the valve-casing to unseat said valve from the intermediate valve-seat and to seat upon the seat at the end of the casing, a coupling member to carry the plunger, and means to actuate said plunger, and means for detachably engaging said coupling member upon the exterior of the valve-casing, said valve seating automatically upon the intermediate valve-seat when the plunger is unseated.

3. In a hose-coupler and valve for the purposes described, the combination of a supply-pipe, a separately-constructed channeled valve-casing secured upon the exterior of the supply-pipe at one end thereof having an end valve-seat at its inner end and an interior seat between the extremities of the casing and provided with exterior laterally-projecting trunnions, a reciprocatory valve seating within the casing upon the interior valve-seat and normally projecting through and beyond the end valve-seat of the casing, a channeled detachable reciprocatory plunger to contact with the end of said valve seating upon the seat at the end of the valve-casing to unseat said valve from the intermediate valve-seat and to seat upon the seat at the end of the casing, a coupling member carrying said plunger provided with hooks to detachably engage the trunnions of the case, and means carried by said yoke to actuate said plunger, said valve seating automatically upon the intermediate valve-seat when the plunger is unseated.

4. In a hose-coupler and valve for the purposes described, the combination of a supply device provided with exterior laterally-projecting trunnions or arms, and an interior valve-seat, and with an end valve-seat, an interior valve seating within said seat to control the passage of the supply through said device, a channeled detachable plunger to seat upon the end valve-seat of said supply device and unseat said valve a yoke carrying said plunger constructed with hooks at one end to be hooked upon and unhooked from said trunnions or arms, and a screw carried by the opposite end of said yoke to actuate said plunger, said plunger being laterally movable in said yoke, and provided with a channeled attaching-arm, said valve seating automatically upon the intermediate valve-seat when the plunger is unseated.

5. In a hose-coupler and valve for the purposes described, the combination of a supply device provided with a valve-casing having an end valve-seat at one extremity thereof and with an interior valve-seat intermediate the extremities of the casing, and with exterior attaching means, an interior valve seating upon the interior valve-seat and movable longitudinally of the supply device to control the passage of the supply through said device, said valve provided with a hollow perforated extremity at the inner end thereof projecting normally through and beyond the end valve-seat, a channeled detachable plunger to seat upon the end valve-seat and thereby unseat said valve from the intermediate valve-seat and provided with a channeled attaching-arm, a yoke carrying said plunger provided with hooks at one end thereof for attaching the same to the supply device, and means carried by the opposite end of said yoke to actuate the plunger, said valve seating automatically upon the intermediate valve-seat when the plunger is unseated.

6. In a hose-coupler and valve for the purposes described, the combination of a supply device provided with a valve to control the passage of the supply through said device and with exterior attaching-trunnions, a reciprocatory detachable channeled plunger to seat upon said device to unseat said valve, a coupling member carrying said plunger provided with hooks for hooking the same upon the trunnions of the supply device and with an inwardly-projecting shoulder through which the plunger projects, means to actuate the plunger, and a spring to aid in normally seating said valve, said plunger having a swiveled engagement in said coupling member, said valve seating automatically upon the intermediate valve-seat when the plunger is unseated.

7. In a hose-coupler and valve for the purposes described, the combination with a channeled supply device of a channeled valve-casing having exterior attaching means, a valve to control the channel of said casing, a reciprocatory detachable channeled plunger to seat upon said casing to unseat said valve, a yoke carrying the plunger and attachable to the attaching means of the supply device, and means carried by said yoke to actuate said plunger, said plunger having a laterally-movable engagement in said yoke, said valve seating automatically upon the intermediate valve-seat when the plunger is unseated.

8. In a hose-coupler and valve for the purposes described, the combination of a channeled supply-pipe, a channeled valve-casing secured upon one end of the supply-pipe and projecting beyond the supply-pipe and provided with external attaching means projecting laterally beyond the supply-pipe, said valve-casing having an end valve-seat and an interior valve-seat, a valve seating within the valve-casing upon the interior valve-seat and normally projecting through and beyond the end valve-seat of the casing, a channeled reciprocatory detachable plunger seating upon the end valve-seat of the casing to unseat said valve, and provided with a channeled attaching-arm, and means to actuate said plunger, said valve having a tubular stem at one end thereof projecting beyond the end valve-seat, said tubular stem provided with lateral openings therein, said valve seating automatically upon the intermediate valve-seat when the plunger is unseated.

9. In a hose-coupler and valve for the purposes described, the combination of a channeled supply-pipe, a separately-constructed channeled valve-case secured upon one end thereof having an end valve-seat and an interior valve-seat, a diaphragm engaged in the end of the supply-pipe, a valve seating within the valve-casing upon the interior valve-seat normally projecting through and beyond the end valve-seat of the casing, and provided with a stem projecting through and guided in said diaphragm, and with a hollow perforated stem at the opposite end thereof guided in the valve-casing, a channeled reciprocatory detachable plunger seating upon the end valve-seat of the casing to unseat said valve, and a yoke to carry and to guide said plunger, said yoke or framework and said valve-case constructed to be hooked one upon the other, said valve seating automatically upon the intermediate valve-seat when the plunger is unseated.

In testimony whereof I have signed this specification in the presence of two subscribing witnesses.

EDWARD H. WOLF.

Witnesses:
N. S. WRIGHT,
M. L. SIMMONS.